(12) United States Patent
Honji et al.

(10) Patent No.: US 9,658,715 B2
(45) Date of Patent: May 23, 2017

(54) DISPLAY MAPPING MODES FOR MULTI-POINTER INDIRECT INPUT DEVICES

(75) Inventors: Scott Honji, Sammamish, WA (US); Lei Wang, Bellevue, WA (US); Peter Drayton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 13/277,220

(22) Filed: Oct. 20, 2011

(65) Prior Publication Data

US 2013/0100158 A1    Apr. 25, 2013

(51) Int. Cl.
*G06F 3/041* (2006.01)
*G06F 3/033* (2013.01)

(52) U.S. Cl.
CPC ............ *G06F 3/0418* (2013.01); *G06F 3/033* (2013.01); *G06F 3/041* (2013.01)

(58) Field of Classification Search
CPC combination set(s) only.
See application file for complete search history.

(56) References Cited

U.S. PATENT DOCUMENTS

| | | | |
|---|---|---|---|
| 5,616,078 A | 4/1997 | Oh | |
| 6,018,340 A * | 1/2000 | Butler | G06F 3/038 345/156 |
| 6,029,214 A | 2/2000 | Dorfman et al. | |
| 6,738,045 B2 | 5/2004 | Hinckley et al. | |
| 6,995,748 B2 | 2/2006 | Gordon et al. | |
| 7,310,103 B2 | 12/2007 | Patton | |
| 7,629,961 B2 | 12/2009 | Casebolt et al. | |
| 7,692,627 B2 | 4/2010 | Wilson | |
| 7,757,186 B2 | 7/2010 | Fabrick | |
| 7,774,155 B2 | 8/2010 | Sato et al. | |
| 7,782,309 B2 | 8/2010 | Janik | |
| 7,796,120 B2 | 9/2010 | Chou | |
| 7,855,718 B2 | 12/2010 | Westerman | |
| 8,537,115 B2 * | 9/2013 | Hotelling et al. | 345/163 |
| 2002/0036622 A1 | 3/2002 | Jaeger | |

(Continued)

FOREIGN PATENT DOCUMENTS

CA    2318815 A1    7/1999
CN    1661556 A    8/2005

(Continued)

OTHER PUBLICATIONS

Moscovich, et al., "Multi-finger Cursor Techniques", Retrieved at <<http://citeseerxist.psu.edu/viewdoc/download? doi=10.1.1.60.1387&rep=rep1&type=pdf>>, Proceedings of Graphics Interface, 2006, pp. 7.

(Continued)

*Primary Examiner* — Tize Ma (57) ABSTRACT

An indirect interaction input device, such as but not limited to a touch sensor, can provide multiple points of input, such as two or more positions in a coordinate space where a user is touching the sensor. These multiple points are in turn mapped to multiple positions on an output device such as a display. The mapping can be relative or absolute. With a relative mapping, boundary conditions for single and multiple displays are applied and, if appropriate, remedial offsets are added to the input points to maintain a desired user interaction model.

20 Claims, 7 Drawing Sheets

(56) References Cited

U.S. PATENT DOCUMENTS

| | | | |
|---|---|---|---|
| 2003/0169277 A1* | 9/2003 | Patton | 345/620 |
| 2003/0222856 A1 | 12/2003 | Fedorak et al. | |
| 2005/0110769 A1 | 5/2005 | DaCosta et al. | |
| 2006/0033712 A1 | 2/2006 | Baudisch et al. | |
| 2006/0244735 A1 | 11/2006 | Wilson | |
| 2006/0267953 A1 | 11/2006 | Peterson et al. | |
| 2006/0279548 A1 | 12/2006 | Geaghan et al. | |
| 2007/0109275 A1 | 5/2007 | Chuang et al. | |
| 2007/0126743 A1 | 6/2007 | Park et al. | |
| 2007/0229455 A1 | 10/2007 | Martin et al. | |
| 2007/0257891 A1 | 11/2007 | Esenther et al. | |
| 2008/0001923 A1 | 1/2008 | Hall et al. | |
| 2008/0001926 A1 | 1/2008 | XiaoPing et al. | |
| 2008/0024459 A1 | 1/2008 | Poupyrev et al. | |
| 2008/0024505 A1 | 1/2008 | Gordon et al. | |
| 2008/0055256 A1 | 3/2008 | Kwong et al. | |
| 2008/0122798 A1 | 5/2008 | Koshiyama et al. | |
| 2008/0259053 A1 | 10/2008 | Newton | |
| 2009/0046110 A1 | 2/2009 | Sadler et al. | |
| 2009/0058829 A1 | 3/2009 | Kim et al. | |
| 2009/0085881 A1 | 4/2009 | Keam | |
| 2009/0122007 A1 | 5/2009 | Tsuzaki et al. | |
| 2009/0128516 A1* | 5/2009 | Rimon et al. | 345/174 |
| 2009/0184939 A1 | 7/2009 | Wohlstadter et al. | |
| 2009/0213084 A1 | 8/2009 | Kramer et al. | |
| 2009/0225049 A1 | 9/2009 | Liu et al. | |
| 2009/0232353 A1 | 9/2009 | Sundaresan et al. | |
| 2009/0256800 A1 | 10/2009 | Kaufman | |
| 2009/0256817 A1 | 10/2009 | Perlin et al. | |
| 2009/0262073 A1 | 10/2009 | Rigazio et al. | |
| 2009/0284479 A1 | 11/2009 | Dennis et al. | |
| 2009/0284495 A1* | 11/2009 | Geaghan et al. | 345/174 |
| 2010/0020025 A1 | 1/2010 | Lemort et al. | |
| 2010/0079493 A1 | 4/2010 | Tse et al. | |
| 2010/0088652 A1 | 4/2010 | Ramsay et al. | |
| 2010/0097342 A1 | 4/2010 | Simmons et al. | |
| 2010/0103117 A1 | 4/2010 | Townsend et al. | |
| 2010/0110040 A1 | 5/2010 | Kim et al. | |
| 2010/0139990 A1 | 6/2010 | Westerman et al. | |
| 2010/0275163 A1 | 10/2010 | Gillespie et al. | |
| 2010/0289754 A1 | 11/2010 | Sleeman et al. | |
| 2010/0309139 A1 | 12/2010 | Ng | |
| 2010/0328227 A1 | 12/2010 | Matejka et al. | |
| 2011/0007021 A1 | 1/2011 | Bernstein et al. | |
| 2011/0012835 A1* | 1/2011 | Hotelling et al. | 345/163 |
| 2011/0022990 A1 | 1/2011 | Wu et al. | |
| 2011/0025648 A1 | 2/2011 | Laurent et al. | |
| 2011/0032198 A1 | 2/2011 | Miyazawa et al. | |
| 2011/0047504 A1 | 2/2011 | Wienands et al. | |
| 2011/0050394 A1 | 3/2011 | Zhang et al. | |
| 2011/0063248 A1 | 3/2011 | Yoon | |
| 2011/0169748 A1 | 7/2011 | Tse et al. | |
| 2011/0193809 A1 | 8/2011 | Walley et al. | |
| 2011/0205182 A1 | 8/2011 | Miyazawa et al. | |
| 2011/0230238 A1* | 9/2011 | Aronsson et al. | 455/566 |
| 2011/0248948 A1 | 10/2011 | Griffin et al. | |
| 2012/0050180 A1 | 3/2012 | King et al. | |
| 2012/0062457 A1* | 3/2012 | Lee | G06F 3/0346 345/157 |
| 2012/0105357 A1 | 5/2012 | Li et al. | |
| 2012/0242586 A1 | 9/2012 | Krishnaswamy et al. | |

FOREIGN PATENT DOCUMENTS

| | | |
|---|---|---|
| CN | 101027679 A | 8/2007 |
| CN | 101118469 A | 2/2008 |
| CN | 101211234 A | 7/2008 |
| CN | 101390036 A | 3/2009 |
| CN | 101430624 A | 5/2009 |
| CN | 101526880 A | 9/2009 |
| CN | 100583019 C | 1/2010 |
| CN | 101626522 A | 1/2010 |
| CN | 102197377 A | 9/2011 |
| EP | 2284677 A1 | 2/2011 |
| JP | 3151652 U9 | 6/2009 |
| KR | 1020100054275 A | 5/2010 |
| KR | 1020110076292 A | 7/2011 |
| WO | 9938149 A1 | 7/1999 |
| WO | 2006020305 A2 | 2/2006 |
| WO | 2011049513 A1 | 4/2011 |
| WO | 2011082477 A1 | 7/2011 |

OTHER PUBLICATIONS

Forlines, et al., "HybridPointing: Fluid Switching Between Absolute and Relative Pointing with a Direct Input Device", Retrieved at <<http://www.dgp.toronto.edu/~ravin/papers/uist2006_hybridpointing.pdf>>, Proceedings of the 19th annual ACM symposium on User interface software and technology, Oct. 15-18, 2006, pp. 211-220.

Moscovich, et al., "Multi-finger Cursor Techniques", Retrieved at <<http://citeseerx.ist.psu.edu/viewdoc/download?doi=10.1.1.60.1387&rep=rep1&type=pdf>>, Proceedings of Graphics Interface, 2006, pp. 7.

McCallum, et al., "ARC-Pad: Absolute+Relative Cursor Positioning for Large Displays with a Mobile Touchscreen", Retrieved at <<http://icie.cs.byu.edu/cs656/Papers/ArcPad.pdf>>, Proceedings of the 22nd annual ACM symposium on User interface software and technology, Oct. 4-7, 2009, pp. 153-156.

Hutterer, et al., "Windowing System Support for Single Display Groupware", Retrieved at <<http://citeseerx.ist.psu.edu/viewdoc/download?doi=10.1.1.107.1233&rep=rep1&type=pdf>>, 2007, pp. 2.

Benko, et al., "Pointer Warping in Heterogeneous Multi-Monitor Environments", Retrieved at <<http://research.microsoft.com/en-us/um/people/benko/publications/2007/benko_pointerwarping_gi07.pdf>>, Proceedings of Graphics Interface, 2007, pp. 111-117.

"International Search Report", Mailed Date: Feb. 15, 2013, Application No. PCT/US2012/066564, Filed Date: Nov. 27, 2012, pp. 9.

"International Search Report", Mailed Date: Feb. 20, 2013, Application No. PCT/US2012/061742, Filed Date: Oct. 24, 2012, pp. 9.

"International Search Report", Mailed Date: Feb. 7, 2013, Application No. PCT/US2012/061225, Filed Date: Oct. 20, 2012, pp. 16.

"Pointer Ballistics for Windows XP", Retrieved at<< http://web.archive.org/web/20110522061105/http://msdn.microsoft.com/en-us/windows/hardware/gg463319.aspx>>, Oct. 31, 2002, 4 Pages.

"Visual Panel: From an Ordinary Paper to a Wireless and Mobile Input Device", Retrieved at <<http://research.microsoft.com/en-us/um/people/zhang/Papers/TR00-112.pdf>>, Oct. 2000, 14 Pages.

"Windows Mouse Things", Retrieved at <<http://donewmouseac-cel.blogspot.in/2009/06/out-of-sync-and-upside-down-windows.html>>, Jun. 14, 2009, 7 Pages.

"YHTK—Feature Rich Universal Touchscreen Controller", Retrieved at <<http://www.flightsim.com/vbfs/showthread.php?225255-YHTK-feature-rich-universal-touchscreen-controller>>, Jan. 13, 2011, 2 Pages.

"Supplementary Search Report Received for European Patent Application No. 12840912.5", Mailed Date: Jul. 14, 2015, 11 Pages.

"Supplementary Search Report Received for European Patent Application No. 12860373.5", Mailed Date: Jun. 18, 2015, 6 Pages.

"Supplementary European Search Report Issued in Application No. 12853539.0", Mailed Date: Mar. 27, 2015, 6 Pages.

"Final Office Action Received for U.S. Appl. No. 13/277,222", Mailed Date: Nov. 29, 2013, 17 Pages.

"Final Office Action Received for U.S. Appl. No. 13/277,222", Mailed Date: Dec. 29, 2014, 25 Pages.

"Non Final Office Action Received for U.S. Appl. No. 13/277,222", Mailed Date: Jul. 23, 2013, 18 Pages.

"Non Final Office Action Received for U.S. Appl. No. 13/277,222", Mailed Date: Aug. 5, 2014, 23 Pages.

"Notice of Allowance Issued in U.S. Appl. No. 13/277,222", Mailed Date: Jun. 30, 2015, 7 Pages.

"Non Final Office Action Received for U.S. Appl. No. 13/280,346", Mailed Date: Feb. 19, 2014, 20 Pages.

"Notice of Allowance Issued in U.S. Appl. No. 13/280,346", Mailed Date: Jul. 7, 2014, 10 Pages.

(56) References Cited

OTHER PUBLICATIONS

"Notice of Allowance Issued in U.S. Appl. No. 13/280,346", Mailed Date: Nov. 13, 2014, 7 Pages.
"Final Office Action Received for U.S. Appl. No. 13/306,989", Mailed Date: Sep. 2, 2014, 13 Pages.
"First Office Action and Search Report Received for Chinese Patent Application No. 201210399507.X", Mailed Date: Jan. 5, 2015, 14 Pages.
"Second Office Action Received for Chinese Patent Application No. 201210399507.X", Mailed Date: Aug. 17, 2015, 6 Pages.
"First Office Action and Search Report Issued in Chinese Patent Application No. 201210399628.4", Mailed Date: Dec. 3, 2014, 12 Pages.
"Notice of Allowance Issued in Chinese Patent Application No. 201210399628.4", Mailed Date: Jul. 30, 2015, 3 Pages.
"First Office Action and Search Report Issued in Chinese Patent Application No. 201210411852.0", Mailed Date: Dec. 3, 2014, 15 Pages.
"First Office Action Issued in Chinese Patent Application No. 201210501550.2", Mailed Date: Feb. 2, 2015, 14 Pages.
Fragiacomo, et al., "Novel Designs for Application Specific MEMS Pressure Sensors", in Sensors, vol. 10, Issue 11, pp. 9541-9563.
Geiger, Gunter, "Using the Touch Screen as a Controller for Portable Computer Music Instruments", in Proceedings of the 2006 conference on New interfaces for musical expression, Jun. 4, 2006, pp. 61-64.
"International Preliminary Report on Patentability Issued in PCT Patent Application No. PCT/US2012/061225", Mailed Date: Apr. 22, 2014, 4 Pages.
"International Preliminary Report on Patentability Issued in PCT Patent Application No. PCT/US2012/061742", Mailed Date: Apr. 29, 2014, 5 Pages.
"International Preliminary Report on Patentability Issued in PCT Patent Application No. PCT/US2012/066564", Mailed Date: Jun. 3, 2014, 6 Pages.
"Non Final Office Action Received for U.S. Appl. No. 13/306,989", Mailed Date: Dec. 13, 2013, 13 Pages.
"Non Final Office Action Received for U.S. Appl. No. 13/306,989", Mailed Date: Feb. 18, 2015, 12 Pages.
"Third Office Action Issued in Chinese Patent Application No. 201210399507.X", Mailed Date: Feb. 26, 2016, 7 Pages.
"Second Office Action Issued in Chinese Patent Application No. 201210501550.2", Mailed Date: Oct. 19, 2015, 11 Pages.

* cited by examiner

DISPLAY MAPPING MODES FOR MULTI-POINTER INDIRECT INPUT DEVICES

BACKGROUND

Manual input devices used for navigation and spatial control of a computing system have a significant impact on capabilities of the computer system and a user's overall experience. There are several kinds of manual input devices. The most common of these for personal computers include single-pointer, indirect interaction devices, such as a mouse or trackpad, and direct interaction devices, such as touchscreens.

A single-pointer, indirect interaction device sensor detects user interaction with the sensor and maps this interaction to a position on a display. One method of mapping points of input to the display involves one-to-one mapping of sensor extents to the extents of the display, which is called absolute mapping. Examples of devices that employ absolute mapping are pen and touch digitizers. Another method involves mapping device sensor coordinates to a movable subportion of the display, which is called relative mapping.

Examples of devices that employ relative mapping are the mouse and devices that emulate the mouse, such as a trackpad. A mouse senses movement, which displaces a presumed starting position by a distance based on the sensed interaction with the device. A trackpad is commonly used in a manner similar to a mouse. The motion of a contact on the trackpad is sensed, and the sensed motion is treated in a manner similar to a mouse input.

A direct interaction device allows interaction with a device that is visually aligned with a display. A direct interaction device maps between positions on a touch sensitive surface and positions on a display of the same size, using an absolute mapping. For example, when a user touches a point on a touchscreen, an input event may trigger an application response, such as command actuation, in the user interface at a position corresponding to the point on the display touched by the user.

Absolute and relative mapping of spatial input from a multi-pointer input device to a display have selective advantages and disadvantages, depending on physical attributes of the input and display devices, the capabilities of the system, the nature and layout of the application user interface, the type of the task the user is performing, and various ergonomic factors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An indirect interaction input device may possess one or more input sensors, each of which can detect and provide multiple points of input. A variety of multi-point input sensing technologies are known in the art, including but not limited to capacitive, resistive, and pressure-based touch sensors, optical sensors, and motion-video skeletal tracking systems. The computations applied in mapping sensor input points to an output such as a display are independent of the manner in which the sensor defines a point of input (other than a discrete position in a two dimensional coordinate space) and the manner in which the point of input is sensed.

For example, a touch-sensitive sensor can provide data indicating two or more positions in a coordinate space where a user is touching the sensor. Such a sensor can be rectangular in shape, but can have other shapes. The sensor can appear similar to a trackpad, but, instead of tracking motion of a single point, it detects multiple points touched by the user. These multiple points are in turn mapped to multiple positions on an output device such as a display.

The relative mapping and absolute mapping of multiple points from an indirect sensor to points on a display is non-trivial. For example, with a relative mapping of multiple points, more computations are involved to determine and manage an appropriate viewport, or subportion of the display, to which the multiple points on the sensor are to be mapped. Other design decisions to be made include boundary conditions for single and multiple displays. As another example, naive absolute mapping of multiple points of input in close physical proximity on a small sensor to a very large display surface may result in the corresponding positions on the display being spaced very far apart.

Accordingly, in one aspect, a computer-implemented process includes receiving information describing input points on a multi-pointer indirect input device into memory. The input points are mapped to locations in a display coordinate space for a display. Bounding conditions are applied to remedy the mapping if one or more mapped input points are outside a visible area of the display.

A computer-implemented process includes receiving information describing input points from a multi-pointer indirect input device into memory. An indication of a selected mapping option is received, selected from among at least relative mapping and absolute mapping. The input points are mapped to locations in a display coordinate space for an output device in accordance with the selected mapping options. The mapping mode can be selected independently for each axis of the display coordinate space.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a multi-pointer, indirect input device can be used.

Figure 1:
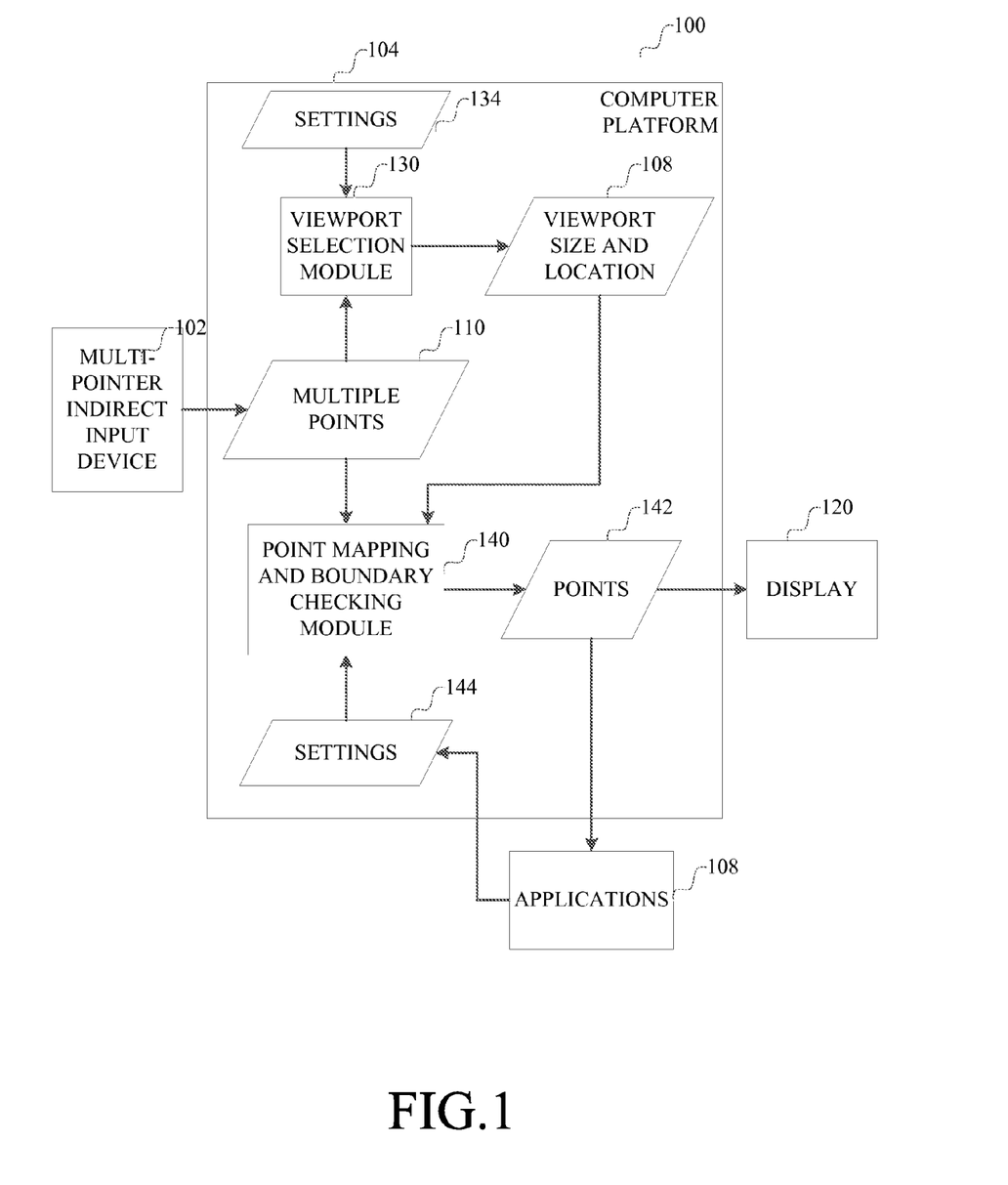
FIG. 1 is a block diagram of a system using a multi-pointer indirect input device.

Referring to FIG. 1, a computer system 100 includes a multi-pointer, indirect input device 102, having a sensor, connected to a computer platform 104 (details of an example of which are described below). Such a computer system may be a personal computer, home entertainment system, a projector, a kiosk application, compact personal electronics, or the like. The computer platform has an operating system which manages interaction between one or more applications 108 and resources of the computer platform 104, such as its peripheral devices including the multipointer indirect input device.

Within the operating system, data describing multiple sensed input points 110 is received from the sensor of the multipointer indirect input device 102. These input points are processed to map them to points on a display 120.

This mapping process involves determine an initial mapping of the device coordinate system to the display coordinate system, which can be relative or absolute, and then a mapping of each point from the device coordinate system to the display coordinate system. Such initial mapping occurs at the beginning of each input session.

An input session is from a point in time a first input is detected by the sensor to a point in time a last input is removed from the sensor. During an input session, the input points are likely to move. The input points are mapped to from their new locations in the sensor coordinate system to corresponding new locations in the display coordinate system. This movement mapping can take into consideration issues such as bounding and acceleration.

As shown in FIG. 1, the multiple points 110 are input to a viewport selection module 130 at the beginning of an input session. The viewport selection module provides, as its output, a viewport size and location 132 in the display coordinate system. The viewport defines a region in the display coordinate space to which the sensor coordinate space is mapped, in a configuration in which multiple device sensors are connected to the system, each sensor has its own viewport. The viewport may have a shape that corresponds to the shape of the input device sensor. In some implementations however, the viewport may have a different aspect ratio or orientation from the sensor, or even a different shape. For example, an ellipsoid sensor may be mapped to a rectangular viewport. The viewport's shape is typically defined by the host system, but may also be defined by the device or the user. The viewport's size and position are computed when user inputs are detected by the sensor. When no user inputs are detected by the sensor, the size and position of the viewport are undefined. The viewport is typically not displayed to the user. Together, the viewport's shape, size and position represent the mapping of the sensor coordinate system to the display coordinate system. Settings 134 determine how this mapping is done, such as by relative or absolute mapping, examples of which are described in more detail below.

The multiple points 110 also are input to an input mapping module 110 throughout an input session. The input mapping module provides, as its output, multiple points 142 in the display coordinate system. Settings 134 determine how each point is mapped, such as by determining device and display reference locations for interpreting relative input positions, applying input motion acceleration, span adjustments, and bounding conditions, examples of which are described in more detail below.

Given the multiple points mapped to a display coordinate system, the multiple points 142 can be displayed on the display. Each point can be treated by the operating system 106 and/or applications 108 in a manner similar to any single point, e.g., for selection of a displayed item, or in a manner similar to multiple points from direct touch input sensors, e.g., effecting zoom, rotation or movement of an element in the host system user interface. The range of possible uses of the multiple points, once mapped to the display, is not limiting of this invention.

Given this context, an example implementation of the mapping of multiple points to a display will now be described in more detail in connection with FIGS. 2-4.

Figure 2:
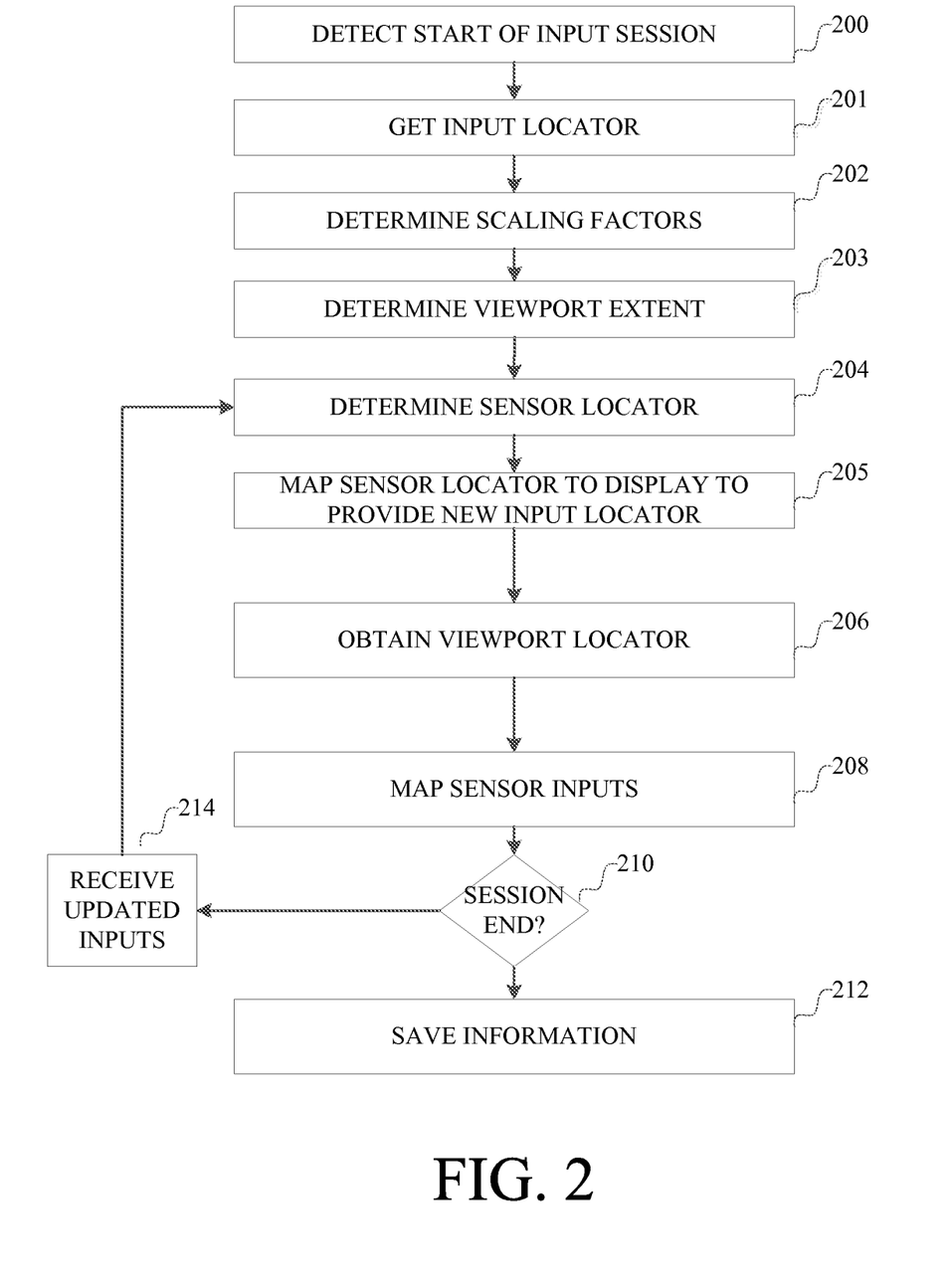
FIG. 2 is a flow chart illustrating an example implementation of viewport placement.

In FIG. 2, a flowchart describes an example implementation of how the viewport size and location can be selected by the viewport selection module, and how points can be subsequently mapped.

It should be noted that the following implementation is based upon certain design decisions about a desirable user experience. For example, it is assumed that the relative position of each physical input with respect to other physical inputs is retained upon projection to the display. It is also assumed that distances between all inputs are scaled symmetrically.

Another aspect of the user experience is the kind of mapping between the input device and the display. The mapping can be relative or absolute, and can be independent for each axis. For example, a relative mapping can be applied to they axis, with an absolute mapping applied to the x axis, or vice versa. Also, both axes can use different relative mappings. The mapping also can be based on logical coordinates or physical dimensions of the input device and the display. If the mapping is based on the physical dimensions of the devices, spatial accuracy is improved, providing a more intuitive and cognitively efficient interface. These decisions about the kind of mapping can be optional settings in the system.

Another aspect of the user experience is a bounding policy. In particular, device inputs can be subject to a display bounding policy for the system. For example, all device inputs can be forced to remain within the display, or only one device input from the set can be forced to remain within the display. Another implementation does not use any bounding policy. These decisions about bounding policy can be optional settings in the system.

The viewport size and location is determined at the beginning of each input session. The start of an input session is detected 200, for example, when one or more input points are detected by the sensor after a period, of no user input. The viewport dimensions in each axis may defined by the input device, the host system, or the user. The dimensions can be expressed as either a percentage of the target display device or in physical units of distance. For physical units of distance to be used, the physical and logical (coordinate) extents of both the input sensor and display are provided, by, for example, the device, user input or other means. A position of an output locator, in the display coordinate space, is then retrieved 201. In this implementation, the output locator position is global to the user session (which begins when a user logs in and ends when the user logs off). The output locator position is shared among and updated by multiple single- and multi-pointer input devices connected to the system. The output locator can be a position saved from a previous input session. If there was no previous input session, then the center of the display device, the last position of a mouse or other device, or an alternative default display location can be used as the output locator position.

Next, given known parameters, i.e., coordinates and bounds, of the display device and input device, scaling factors for each axis are determined 202. These parameters typically are stored in memory. In the case of display device, parameters can be retrieved using system API's. In the case of the input device, parameters can be retrieved via device interrogation. Given the coordinates and bounds of the display and input devices, the scaling factors are determined. If an absolute mapping is used, computations based on physical extents are not necessary, and the x and y axis scale factors are based on a one-to-one ratio of the device and display coordinate extents. If a relative mapping is used, then the x and y axis scale factors are determined by the ratios of the device dimensions to the viewport dimensions in display coordinates. The scale factors can be computed once, stored in memory and retrieved when needed.

The viewport extent, i.e., x and y coordinates of its vertices, in the display coordinate space is determined 203 using the determined scale factors. The viewport extent is initially determined for an input session using the saved output locator, before a new output locator is computed as follows.

For a scaled viewport using the pixel density of the display, the scale factors SV are non-zero, positive values between 0 and 1, and the extent of the viewport Rv=
$\{L_{V0x}-S_{Vx}/[2*\text{extent}(R_{Dx})],$
$L_{V0x}+S_{Vx}/[2*\text{extent}(R_{Dx})],$
$L_{V0y}-S_{Vy}/[2*\text{extent}(R_{Dy})],$
$L_{V0y}+S_{Vy}/[2*\text{event}(R_{Dy})]\}$, where $L_{V0}$ is an initial viewport locator, typically the center of the target display, $S_V$ are the scale factors and extent $(R_D)$ are the x and y coordinate extents of the display, i.e., its pixel width and height, and subscripts x and y indicate those values on the x and y axes.

For a viewport using physical dimensions, where the desired size $S_V$ is a non-zero, positive value no greater than the physical extent of the target display, and the pixel density D of the display is known via hardware interrogation, the extent of the viewport $R_v=$
$\{[L_{V0x}-S_{Vx}/[2*\text{extent}(R_{Dx})]]*D_x+R_{Dx.left},$
$[L_{V0x}+[S_{Vx}/[2*\text{extent}(R_{Dx})]]*D_x+R_{Dx.left},$
$[L_{V0y}-[S_{Vy}[2*\text{extent}(R_{Dy})]]*D_y+R_{Dy.top},$
$[L_{V0y}+S_{Vy}/[2*\text{extent}(R_{Dy})]]*D_y+R_{Dy.top}\},$ Given an initial extent of the viewport, a sensor locator is then determined 204, initially in the device coordinate system. There are many ways to select the sensor locator, and the particular way chosen is dependent on the desired user interaction. For example, if there is a single input detected by the sensor, the sensor locator can be the coordinates of this single input. If there are multiple inputs, then the sensor locator can be the position of a single "primary" input, or a point having a particular relationship with other inputs, such as the geometric center of all inputs. The sensor locator is undefined when no input points are detected and is not persisted between input sessions.

When the position of a primary input is used as the sensor locator, one of a variety of methods can be used to select and assign primary status to the input. In general, the "primary" input is an input point chosen from among the others by any method. For example, the primary input can be the first input, or the last input, detected in the session. This method carries the drawback of forcing an arbitrary selection in the case of multiple inputs arriving simultaneously. A solution is for the primary input to selected by a form of geometric ordering, such as the highest order input according to a geometric sorting formula (which can be interaction dependent). For example, a sorting formula can sort angles formed by each input point with respect to an origin at the geometric center of all inputs and a reference point. The reference point can be, for example, a vertical line with angle measured based on left or right handedness of a user.

Regardless of method, sensor locator determination may be affected by the time of arrival and departure of inputs. To protect against the condition in which the user intends to arrive or depart multiple inputs simultaneously but instead arrives or departs them at slightly different times, a small time window (e.g., 10-60 ms) can be used to delay sensor locator calculation.

Next, the sensor locator position is mapped 205 from device coordinates to display coordinates. The result is a new output locator position for the frame. This position can be computed by $[L_S/\text{extent}(R_S)*\text{extent}(R_V)]+R_{V0}$, where $L_S$ is the x or y coordinate of the sensor locator, extent$(R_S)$ is the width or height of the sensor coordinate space, and extent $(R_V)$ is the width or height of the viewport, and $R_{V0}$ is the width or height of the initial viewport. This new output locator is constrained to be within the bounds of the display.

Given the new output locator, the viewport is then positioned in the display coordinate space by obtaining 206 the viewport locator. For the first frame of the session, the viewport position is determined; in subsequent frames it is retrieved from memory. The position of the viewport is determined logically, meaning that it is optional whether to display the viewport. In fact, in most implementations it is likely to be preferable not to actually display the viewport.

As noted above, the viewport is a projection of the input sensor coordinate space on the display, and the viewport locator position is the geometric center of the viewport, display coordinates. As also noted above, unlike the output locator, the viewport is undefined when no inputs are detected by the sensor. It is associated with a particular device instance (rather than global to the user session), and its position is updated when the user initially places inputs on the sensor. After an input session starts, and until the input session ends, the viewport remains stationary between frames. If a frame represents a continuance of an input session (lists of input points from both previous and current frames are not empty), then the viewport locator is retrieved from memory. If the frame initiates a new input session, then the viewport locator is obtained by determining an offset between a sensor locator (determined in step 205) and the output locator position (determined in step 201), as follows.
$\Delta L_D=L_D-L_{D0}$
$L_V=[L_S/\text{extent}(R_S)*\text{extent}(R_V)]+L_{V0}+\Delta L_D$ $L_V$ is then constrained to the bounds of the target display and the extent of the viewport, determined above, is recalculated using the new viewport locator.

After computing the sensor locator, viewport locator, and output locator for a frame, the sensor inputs for that frame are then mapped 208 to display coordinates, in a manner described in more detail below. If the input session ends, as determined at 210, then some information about the input session can be saved 212 (such as the last output locator). If the input session has not ended, and if updated sensor input positions are received (as determined at 214), then the process repeats with determining the sensor locator 204 for the frame, through mapping 208 these new sensor inputs to the display. However, where the frame is part of a continuing session, the viewport locator is not determined in step 206, but is retrieved front memory.

Figure 3:
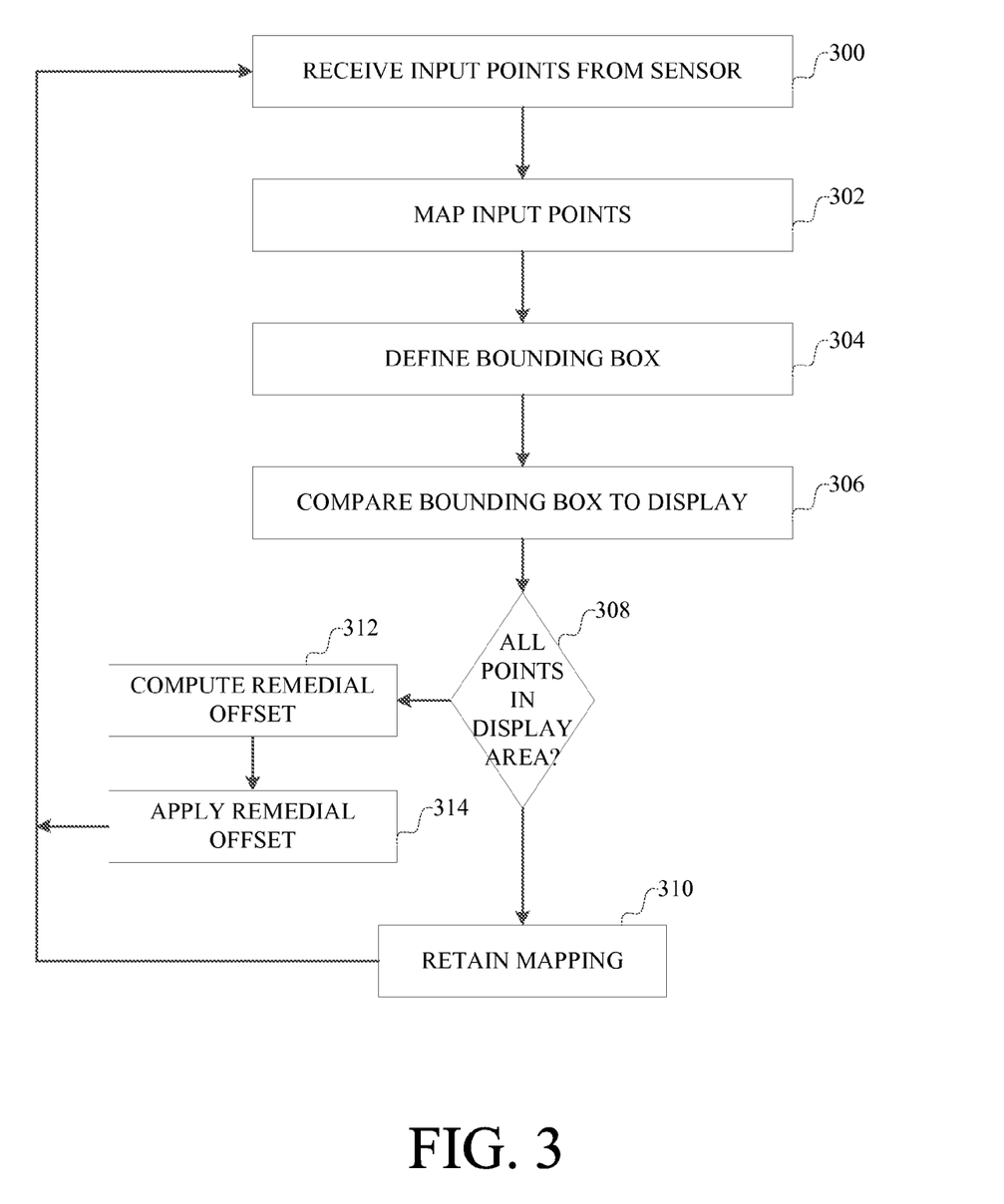
FIG. 3 is a flow chart illustrating an example implementation of input mapping.
Figure 4:
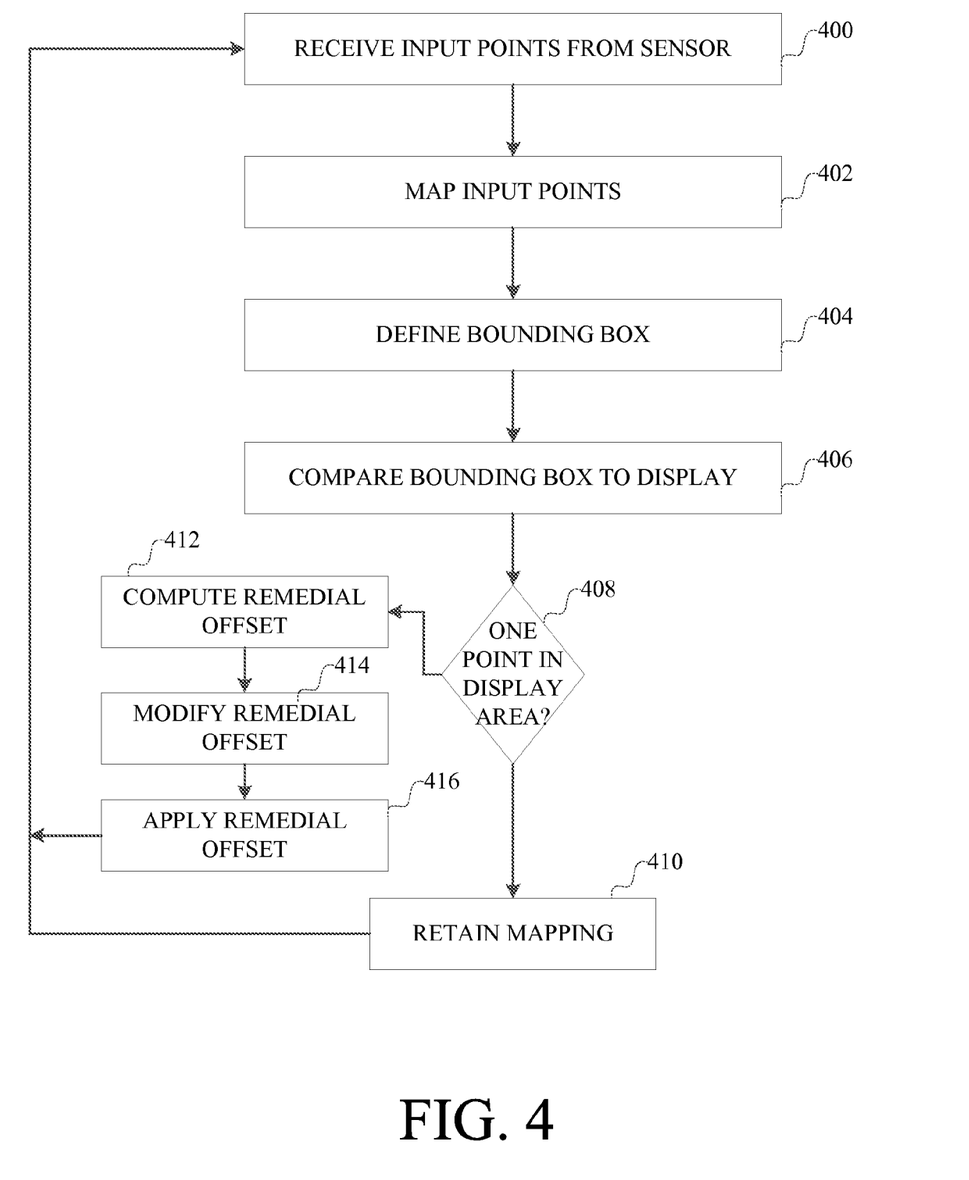
FIG. 4 is a flow chart illustrating another example implementation of input mapping.

FIG. 3 describes how, given the viewport size and location, sensor inputs are mapped to points in the viewport, including the enforcement of boundary conditions (if relative mapping is done) on a single display. FIG. 3 describes a case in which all inputs are constrained to being within the display.

The system receives 300 a list of input points from the device, each having coordinates in the device coordinate space. Next, the input points are mapped 302 to their corresponding points in display coordinate space. For example, the coordinates $C_D$ in display coordinate space of a point $C_S$ in device coordinate space can be computed by $[C_S/\text{extent}(R_S)*\text{extent}(R_V)] R_V$.

A bounding box containing the input points is defined 304. The corners of the bounding box are mapped to and compared 306 to the visual extent of the display. If none of the corners of the bounding box is outside of the visual area of the display, then the input mapping is retained 310. Otherwise, an offset to move the bounding box to be within the visual extent of the display is determined 312. In computing the minimal remedial offset, a displacement vector between previous and current frames of each non-conforming corner of the input bounding box or the individual input define a path and its point of intersection with the visible display boundary. The remedial offset is the displacement between the path's origin and the point of intersection. This offset is applied 314 to the points to re-map them to new positions within the visual area of the display.

In another implementation, the points are constrained so that at least one input point from the device remains displayed. In FIG. 4, the system receives 400 a list of input points from the device, each having coordinates in the device coordinate space. Next, the input points are mapped 402 to their corresponding points in display coordinate space. A bounding box containing the input points is defined 404. The corners of the bounding box are then compared 406 to the visual extent of the display. If at least one of the corners of the bounding box remains in the visual area of the display, then the input mapping is retained 410. Otherwise, a remedial offset to move at least one point of the bounding box to be within the visual extent of the display is determined 412. Next, an offset of the input nearest the contained corner is determined and applied 414 to remedial offset. This updated remedial offset is applied 416 to the points to re-map them to new positions within the visual area of the display.

For multiple monitor displays, the process is similar. There are regular display topologies, where the union of visible areas of the display is a single, rectangular, "virtual" display with no internal voids. For regular display topologies, bounding of multiple inputs to the boundaries of the virtual display surface is identical to that for a single display. There also can be irregular display topologies, where the union of visible areas of the display is a rectilinear virtual display with convex or concave internal voids. For these display topologies, the foregoing methods can be used to compute and apply remedial offsets.

However, an additional failure case is where a point lies in one of the convex or concave internal voids, a bounding box containing only those points outside of the visual area of the display can be computed, and used to compute a remedial offset. In this case, a bounding box is computed to contain input points that do not map to visible areas of the display, herein called a non-conforming bounding box. A minimal remedial offset is computed by which to ensure at least one corner of a non-conforming bounding box is contained within the visible portion of the display. This remedial offset is applied to the device-to-display transform for all inputs.

A more specific example implementation of boundary conditions for multiple monitors will now be described.

In this example, for each input, a target bounding display ($R_{D,\ target}$) is determined in the following way. First, it is determined if the input position $C_D$ is not contained within a visible region of the virtual display surface. If it is not, then the coordinates of display $R_{D0}$ of the input for the previous frame are retrieved. For a frame representing a new session, these coordinates are substituted with those of the display containing the output locator position $L_D$. Next, it is determined whether the input $C_D$ remains bounded by $R_{D0}$ in either the x or y axis. If a positive test is observed in either axis, then the target bounding display is the display $R_{D0}$. Otherwise, the input is out of the bounds of display $R_{D0}$. A displacement vector $\Delta S_S$ in sensor coordinates is then determined for this input: $\Delta S_S = C_S - C_{S0}$. The extent of the sensor, extent($R_S$), is retrieved. The dominant axis of displacement is determined. The X axis dominates if $|\Delta S_{Sx}/\text{extent}(R_{Sx})| > |\Delta S_{Sy}/\text{extent}(R_{Sy})|$. Otherwise the Y axis dominates.

The dominant axis of input displacement is then used to determine a target bounding display. If the X axis is dominant, then the target bounding display $R_{D,\ target}$ is the display that satisfies the following conditions: 1, the input falls in the horizontal range of the display; 2. the target display is in the primary moving direction of the input and shares that boundary with the last display; and 3, the last input position falls into the vertical range of the display. If the Y axis is dominant, then the target bounding display $R_{D,\ target}$ satisfies the following conditions: 1, the input falls in the vertical range of the display; 2. the target display is in the primary moving direction of the input and shares that boundary with the last display; and 3, the last input position falls into the horizontal range of the display.

If the target bounding display cannot be determined using the dominant direction, then a search is performed in the non-dominant direction. If the target bounding display is still not found, the target display is the input's previous display.

Given the target bounding display for an input, the input is clamped, to that display, and the clamping offset is calculated and stored. This clamping offset is applied to all inputs so that the relative distance among them is maintained. After adjusting the inputs in this manner, they are all tested again to ensure they are on the visible part of the display.

In some interaction modes, a small amount of time is allowed to realize the user's intention to make multiple inputs with the sensor simultaneously. When the first input of a session is observed, a timer is activated and arriving inputs are marked inactive, and sensor locator determination is deferred, until timer expiration, or terminated if arriving inputs are removed. Likewise, the user may intend to depart inputs simultaneously. To realize this intention without affecting sensor locator position, a timer can be used. The timer is activated, and departing inputs continue to be included in sensor locator computations until the timer expires.

In the foregoing description, in both relative and absolute mapping modes, the input points are mapped directly to display coordinates. In a relative mapping mode, however, the input device can span only a subset of the target display coordinate space. Therefore, navigation from one display location to another location can involve multiple strokes, unless some form of acceleration of the points is applied as movement of the input points is detected. Conversely, in order to achieve pixel-level, point-to-point targeting precision, a form of deceleration of the points can be applied. Such acceleration and deceleration, sometimes referred to as "pointer ballistics," can be applied to a multiple input, indirect input device in the following manner. The displacement of input points on the input device is taken into consideration in the mapping of the input points from the device coordinate space to the display coordinate space, to accelerate or decelerate, as the case may be, movement of the points on the display. In general, a measure of displacement for the input points is determined. This displacement is the input to a function that determines, based on the displacement, how to alter the mapping of the input device points to their corresponding display coordinates.

In one implementation, the displacement of each input point is determined. The physical displacement in sensor pixels of the input with the lowest magnitude displacement vector is passed through an acceleration curve transform to produce a single accelerated display displacement, and this is applied to the display displacements of the output locator and all points. The inputs to the acceleration function can be either the vector magnitude or a value for each axis can be input to two different acceleration functions. This implementation will now be described in connection with FIG. 5.

Figure 5:
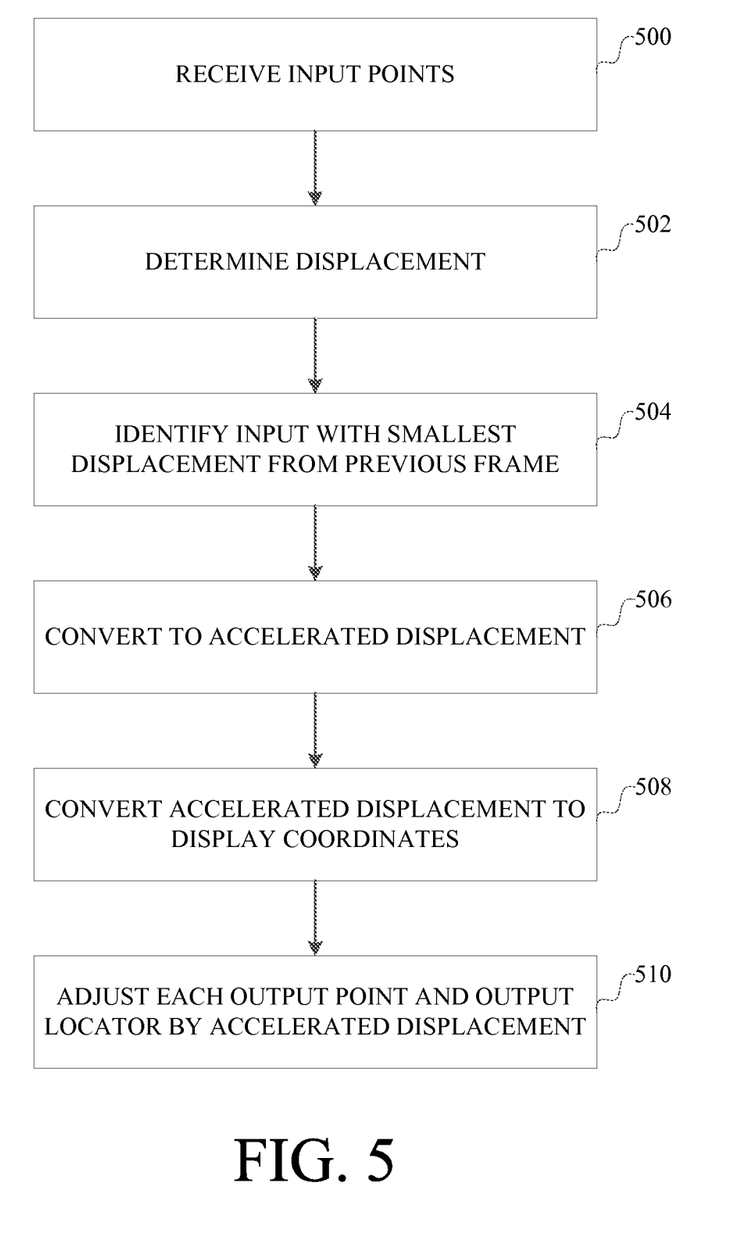
FIG. 5 is a flow chart illustrating an example implementation of input acceleration.

First, input points on an input sensor, from first and second points in time, are received 500. Note that how to uniquely identify and track moving or stationary inputs, known in the art as "input recognition and tracking," is device and sensor specific. The invention is not limited to any specific input recognition and tracking technique. Any technique for such recognition and tracking that has been found to be suitable in the art can be used.

The displacement in device coordinates (i.e., pixels) in each dimension of each input within a time interval is then determined 502. If the time intervals are known to be constant, then the displacement alone can be used. Otherwise the time interval can be used to compute velocity.

For each time interval, or "frame," of inputs, the input with the smallest magnitude displacement, or velocity, is identified 504. The input with the lowest magnitude is chosen (rather than the average or maximum, for example) so that inputs held stationary on the input sensor remain stationary when mapped to the display.

The displacement of the identified input can be converted from a displacement in pixels to a physical displacement, using the pixel density of the sensor. The displacement value is used as an input to an acceleration function to transform 506 the value to an accelerated, displacement. The invention is not limited by the specific acceleration formula, used. Any reasonable technique currently used in the art, such as used for mouse pointer acceleration, can be used. The invention generally can be applied to any acceleration formula that permits independent acceleration of each coordinate axis (x, y or z). A suitable transform can be implemented using a piece-wise linear function that maps a displacement value to an accelerated displacement value. The accelerated displacement value, if based on physical dimensions can be converted back to pixel coordinates.

The accelerated displacement is then converted 508 to an accelerated displacement in display coordinate space. For example, the conversion can be expressed, by the following: $\Delta C_D = \Delta C_S / \text{extent}(R_S) * \text{extent}(R_T)] + R_T$. Each input position mapped to display coordinates is then adjusted 510 by the accelerated displacement.

Figure 6:
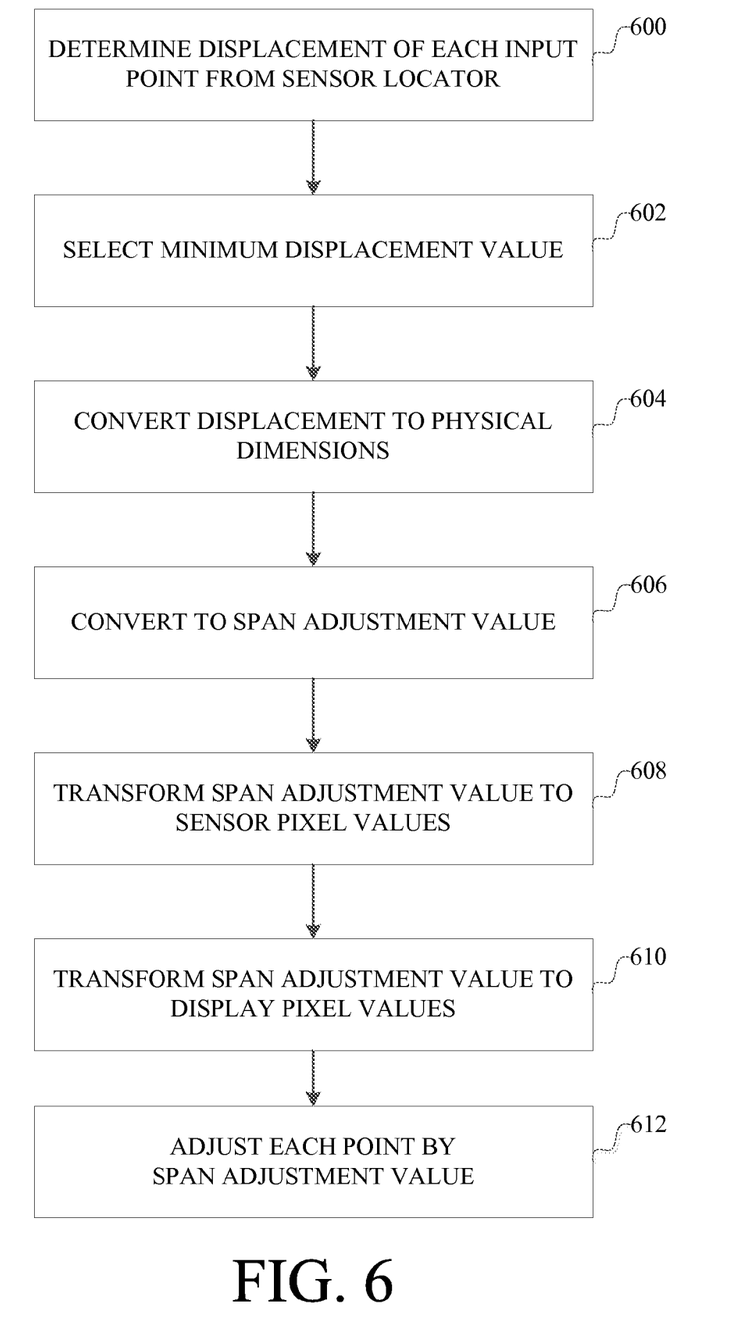
FIG. 6 is a flow chart illustrating an example implementation of span adjustment.

For absolutely mapped dimensions, a similar process called span adjustment can be used, as described in connection with FIG. 6. In FIG. 6, the displacement of each input from the sensor locator is determined 600, in pixels in the device coordinate space. The minimum displacement is selected 602. This minimum displacement value is converted 604 to physical dimensions using the pixel density of the device. The minimum displacement value in physical dimensions is transformed 606 to a span adjustment value, using any appropriate transform. A suitable transform may be similar to the acceleration transform, such as a piece-wise linear function that maps a displacement value to a span adjustment value. This span adjustment value is converted 608 back to pixel values. Similar to acceleration, the span adjustment value is then transformed 610 to display pixel values, and each input point is adjusted 612 using that value.

It should be noted that the acceleration and span adjustment modification to input points is done prior to applying the boundary conditions that ensure that points remain in the visible display area.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
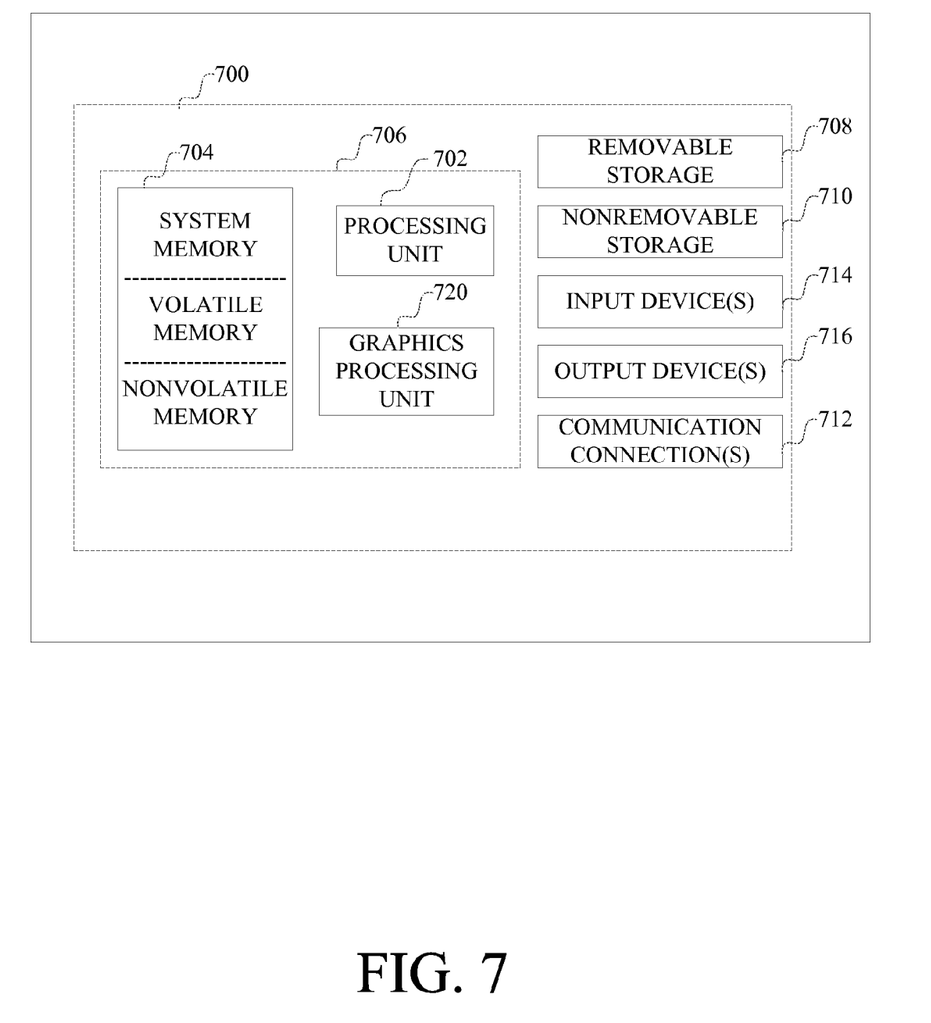
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 71 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here.

The system can be implemented in the general context of software, including computer-executable instructions and/or computer-interrupted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network in a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   receiving information describing input points from a multi-pointer indirect input device into memory;
   mapping the input points to coordinates in a display coordinate space for a display including multiple monitors;
   determining if the coordinates for a mapped input point are not within a visible area of the display, wherein the determining comprises determining if the coordinates for the mapped input point lie in an internal void in a virtual display area encompassing the multiple monitors;
   in response to determining that the coordinates of the mapped input point lie in an internal void in the virtual display area encompassing the multiple monitors:
      selecting a nonconforming bounding box containing points outside of the visible area of the display;
      computing an offset between coordinates of the nonconforming bounding box and coordinates of the visible area of the display in the display coordinate space that, when added to coordinates of at least one corner of the nonconforming bounding box, places the at least one corner of the nonconforming bounding box within the visible area of the display;
   adding the computed offset to the coordinates of the mapped input points to provide updated coordinates for the mapped input points, such that the updated coordinates of at least one of the mapped input points is within the visible area of the display; and
   displaying output points, corresponding to the input points, on the display at the updated coordinates for the mapped input points.

2. The computer-implemented process of claim 1, wherein mapping further comprises:
   selecting an input locator in device coordinate space; and
   mapping the input locator to an output locator in display coordinate space.

3. The computer-implemented process of claim 2, further comprising determining size and location of a viewport representing the device coordinate space in display coordinates according to the output locator.

4. The computer-implemented process of claim 2, wherein selecting the input locator comprises selecting a first arriving input point as the input locator.

5. The computer-implemented process of claim 2, wherein selecting the input locator comprises selecting a point with geometric precedence over other points as the input locator.

6. The computer-implemented process of claim 1, further comprising applying a timer to the received input points to account for arrival and departure timeout of the received input points on the multi-pointer indirect input device.

7. The computer-implemented process of claim 1, further comprising:
   receiving an indication of a selected mapping option, selected from among at least relative mapping and absolute mapping;
   wherein mapping the input points to coordinates in the display coordinate space is performed in accordance with the selected mapping option.

8. The computer-implemented process of claim 7, wherein the selected mapping is a relative mapping.

9. The computer-implemented process of claim 1, wherein the computed offset, when added to the coordinates of the mapped input points, places the coordinates of all mapped input points within the visible area of the display.

10. An article of manufacture, comprising:
    a computer-readable storage device;
    computer program instructions stored on the computer readable storage device which, when processed by a computer, instruct the computer to perform a process comprising:
    receiving information describing input points from a multi-pointer indirect input device into memory;
    mapping the input points to coordinates in a display coordinate space for a display including multiple monitors;
       determining if the coordinates of the mapped input points are not within a visible area defined by outer boundaries of the display, comprising determining if the coordinates for a mapped input point lie in an internal void in a virtual display area encompassing the multiple monitors;

in response to a determination that the coordinates of the mapped input point lie in the internal void in the virtual display area:
  selecting a nonconforming bounding box containing points outside of the visible area of the display; and
  computing an offset between coordinates of the nonconforming bounding box and coordinates of the visible area of the display in the display coordinate space that, when added to coordinates of at least one corner of the nonconforming bounding box, places the at least one corner of the nonconforming bounding box within the visible area of the display;
  adding the computed offset to the coordinates of the mapped input points to provide updated coordinates for the mapped input points, such that the updated coordinates of at least one of the mapped input points is within the visible area of the display; and
displaying output points, corresponding to the input points, on the display at the updated coordinates for the mapped input points.

11. The article of manufacture of claim 10, wherein mapping further comprises:
  selecting an input locator in device coordinate space; and
  mapping the input locator to an output locator in display coordinate space.

12. The article of manufacture of claim 11, further comprising determining a size and location of a viewport representing the device coordinate space in display coordinates according to the output locator.

13. The article of manufacture of claim 11, wherein selecting the input locator comprises selecting a first arriving input point as the input locator.

14. The article of manufacture of claim 11, wherein selecting the input locator comprises selecting a point with geometric precedence over other points as the input locator.

15. The article of manufacture of claim 10, further comprising applying a timer to the received input points to account for arrival and departure timeout of the received input points on the multi-pointer indirect input device.

16. The article of manufacture of claim 10, wherein the process performed by the computer further comprises receiving an indication of a selected mapping option, selected from among at least relative mapping and absolute mapping, and wherein mapping the input points to coordinates in the display coordinate space is performed in accordance with the selected mapping option.

17. The article of manufacture of claim 10, wherein the computed offset, when added to the coordinates of the mapped input points, places the coordinates of all mapped input points within the visible area of the display.

18. A computer system, comprising;
  a processor and memory;
  an input connection to receive information describing input points from a multi-pointer indirect input device into the memory;
  the processor being configured to:
    map the input points to coordinates in a display coordinate space for a display, the display including multiple monitors, and determine if the coordinates of the mapped input points are not within a visible area of the display;
    determine if the coordinates for a mapped input point are not within a visible area defined by outer boundaries of the display, comprising determining if the coordinates for the mapped input point lie in an internal void in a virtual display area encompassing the multiple monitors;
    in response to a determination that the coordinates of the mapped input point lie in the internal void of the virtual display area, to:
      select a nonconforming bounding box containing points outside of the visible area of the display;
      compute an offset between coordinates of the nonconforming bounding box and coordinates of the visible area of the display in the display coordinate space that, when added to coordinates of at least one corner of the nonconforming bounding box, places the at least one corner of the nonconforming bounding box within the visible area of the display;
      add the computed offset to the coordinates of the mapped input points to provide updated coordinates for the mapped input points, such that the updated coordinates of at least one of the mapped input points is within the visible area of the display; and
      display output points, corresponding to the input points, on the display at the updated coordinates for the mapped input points.

19. The computer system of claim 18, wherein the computed offset, when added to the coordinates of the mapped input points, places the coordinates of all mapped input points within the visible area of the display.

20. The computer system of claim 18, wherein the processor is further configured to receive an indication of a selected mapping option, selected from among at least relative mapping and absolute mapping, and wherein the processor is further configured to map the input points to coordinates in the display coordinate space in accordance with the selected mapping option.

* * * * *